Oct. 13, 1970 W. H. BOCKWOLDT 3,534,169

DUAL MODE PHASE LOCK SYNCHRONIZER FOR COLOR TELEVISION SIGNAL TRANSMITTING AND RECEIVING

Filed Aug. 24, 1967 7 Sheets-Sheet 1

INVENTOR.
WALTER H. BOCKWOLDT,
BY
Robert Thompson
ATTORNEY.

3,534,169

DUAL MODE PHASE LOCK SYNCHRONIZER FOR COLOR TELEVISION SIGNAL TRANSMITTING AND RECEIVING

Walter H. Bockwoldt, Woodland Hills, Calif., assignor to Hughes Aircraft Company, Culver City, Calif., a corporation of Delaware Filed Aug. 24, 1967, Ser. No. 663,133
Int. Cl. H04n 1/22, 5/04
U.S. Cl. 178—69.5 32 Claims

ABSTRACT OF THE DISCLOSURE

A television circuit synchronizer which: in a first (encode) mode of operation is responsive to base frequency signals such as the horizontal sync signal ($f_h$) of a video signal for generating: a vertical sync signal, a horizontal sync signal, a tone burst signal, and a pilot signal, and is coupled to modulate the video signal with the tone burst signal during the duration of the generated vertical sync signal and with the generated horizontal sync signal so that the modulated sync signal can be transmitted or played back in synchronism with the pilot signal; and in a second (decode) mode of operation, the synchronizer is responsive to the received or played back pilot signal for generating: a sampling signal, a vertical sync signal, and a horizontal sync signal each phase related to the received pilot signal. A lock-in circuit is coupled to receive the played back horizontal sync signal and the vertical sync tone burst signal detected from the video signal for determining the phase deviation between the generated and played back horizontal sync signals and the generated and played back vertical sync signal, and is further coupled to the synchronizer for shifting the phase of the generated vertical sync signal, horizontal sync signal and a sampling signal into synchronism with the played back vertical sync tone burst signal and horizontal sync signal respectively.

This invention relates generally to television system synchronization and particularly to television signal synchronization of a type that can be used in a television recording system.

In the television technology, it is sometimes necessary to conduct the television signal in a manner or environment that results in a low signal-to-noise ratio. The noise signals can be especially troublesome to a television signal because of the high time base stability requirements. An example of one type of environment which results in low signal-to-noise ratio is a television recording system described in copending U.S. patent application Ser. No. 563,763, entitled, "Television Bandwidth Reduction," filed July 8, 1966, by Russell R. Law. In this type of system, a low signal-to-noise ratio resulted when playing back television signals from a magnetic tape because of tape dropout, poor recorder stability, etc. Of course, other operating conditions or environments such as low resolution and interlaced television, or transmission over extremely long distances at relatively low power levels could create similar noise problems which could affect the synchronization of the television signal.

Accordingly, it is an object of this invention to provide means and methods for synchronizing television signals in a manner which has the advantage of being useful when the signal-to-noise ratio is low.

Another object of this invention is to provide a device for providing highly stable horizontal and vertical synchronization of a television signal.

Yet another object of this invention is to provide a device for synchronizing the television signals in a television signal recording system.

Still another object is to provide a device for synchronizing a television signal from a clock signal.

Other objectives, features and advantages of this invention can be attained in a system of the type including an encoder coupled to receive a video signal; a synchronizer operating in a first mode, coupled to impress a tone burst signal 22 $f_h$ on the encoded video signal, and for generating a base frequency horizontal sync signal $f_h$ and a base frequency vertical sync signal $f_y$ for modulating the video signal and for generating a pilot or clock signal P; a recorder coupled to receive the encoded and modulated signal and the pilot signal P; a decoder coupled to receive played-back video signal from the recorder; and the synchronizer in a second mode responsive to the played-back pilot or clock signal P for generating a horizontal sync signal $f_h$ and vertical sync signal $f_v$; an automatic lock-in circuit for determining phase deviation between the generated signals and the played-back signals for correcting the phase of a horizontal sync signal and vertical sync signal generated by the synchronizer in response to the played-back pilot signal.

Other objects, features and advantages of this invention will become apparent upon reading the following detailed description of one embodiment and referring to the accompanying drawings in which.

Figure 1:
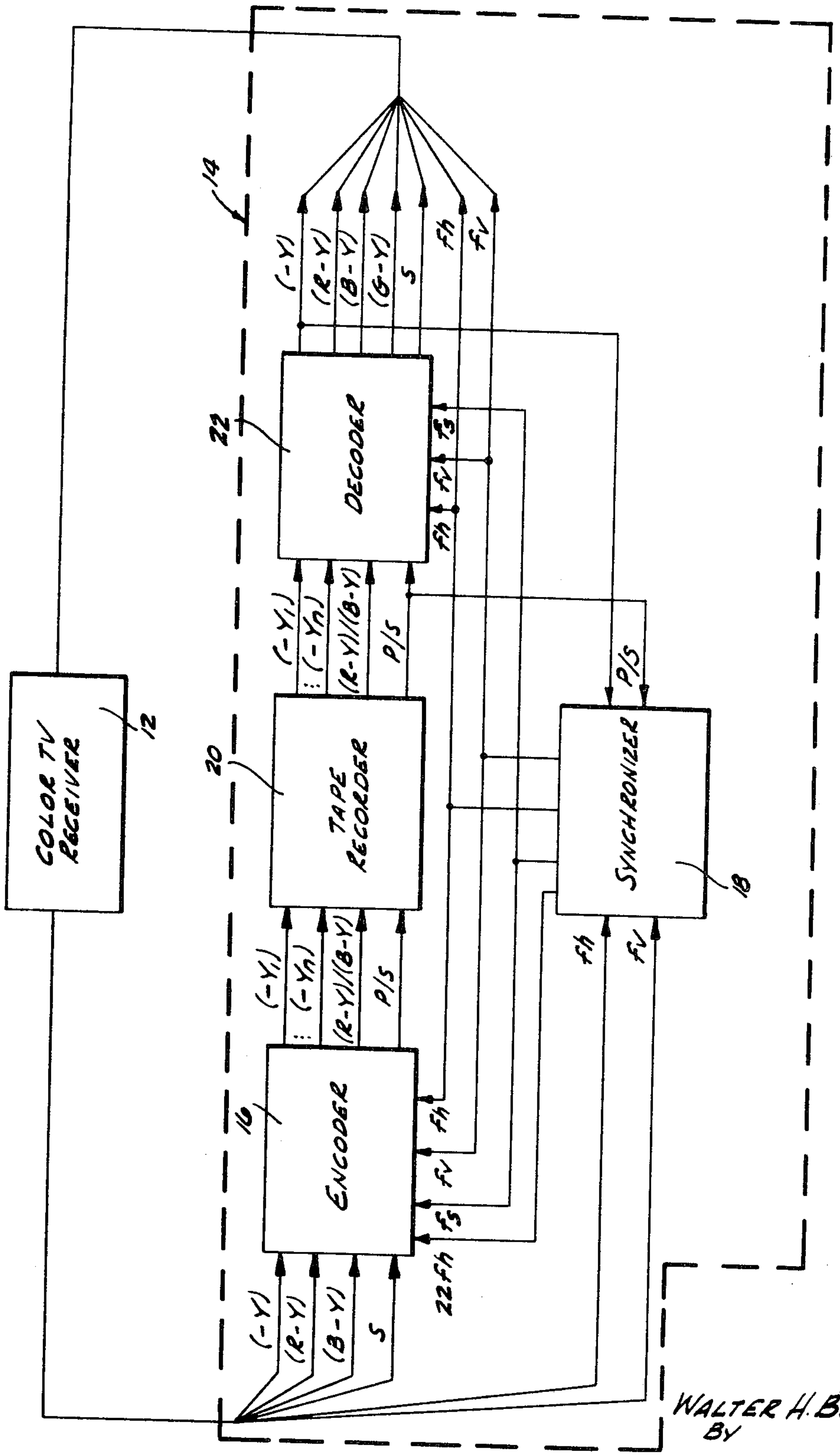
FIG. 1 is a block diagram of a television system showing an encoder, a recorder, a decoder and a synchronizer and their relationship to a television receiver.

Referring now to the embodiment of the video tape recorder system, FIG. 1 illustrates the operational relationship between a color receiver 12 and a video tape recorder system 14. The video tape recorder system 14 includes an encoder 16 which is coupled to receive the luminance signal (–Y) and the chrominance signals (R–Y) and (B–Y) from a convenient tap point in the receiver 12. The encoder 16 is selectively controlled by the output signal $f_s$ from a synchronizer 18 for sampling the luminance signal (–Y) and output horizontal sync signals $f_h$ for switching the chrominance signals (R–Y) and (B–Y) in accordance with a sampling and switching pattern described in copending U.S. patent application S.N. 563,763, filed by Russell R. Law on July 8, 1966. Since the specific luminance sampling pattern utilized by the described embodiment is not a part of this invention and the particular video tape recorder system is illustrated to provide background for one particular utility of the invention, the specific sampling pattern and switching pattern will not be described in detail herein. However, by way of background, it should be stated that the encoder 16, in response to sampling signal $f_s$, samples the received luminance signal (–Y) in an evenly spaced pattern of sampled data ($-Y_1$) through ($-Y_n$) on parallel channels which is repeated after every $n$ video frame. In addition, the encoder 16 receives the red chrominance signal (R–Y) and blue chrominance signal (B–Y) and selectively switches them on a line-by-line basis in response to the generated horizontal sync signal $f_h$ so that they are alternately fed on a single channel to the decoder 20.

The sound or audio signal S and a clock or pilot signal P are both recorded on the same recording track within recorder 20. In practice, the audio signal S received from the receiver 12 is mixed with and amplitude modulates the pilot signal P, which is a function of a sampling signal $f_s$ generated by the synchronizer 18 to form a combined signal *P/S* that is recorded on a single recording track within the tape recorder 20. Since the pilot signal P is recorded at fixed tape positions relative to the positions of the recorded luminance information, and the recorded chrominance information, the time-base of the recorded video information is fixed by the tape itself. As a result, the effects of time-base instability in the recording medium is significantly reduced.

The tape recorder 20 can be of the multiple channel type in which a magnetic tape is moved linearly relative to a multiple track recording head. In accordance with the features described with respect to an embodiment of the invention, it is possible to record at substantially uniform liner speed of 30 i.p.s. (inches-per-second). Thus, the mechanical structure of the tape recorder can be of a relatively simple type.

The recorded signals can be played back from the recording medium and reconstructed into a color image at a decoder 22. The decoder 22 is coupled to receive the recorded signals played back from the tape recorder 20, wherein they are combined and reconstructed into a color image of the original scene at the color television receiver 12.

In the decoding operation, the complementary sets of sampled luminance signals ($-Y_1$) through ($-Y_n$), received by the decoder 22 are selectively gated in accordance with the sampling pattern derived by the encoder 16, as fixed by the time base of the recorded pilot signal P, and are recombined into a decoded luminance signal (–Y) which is fed to the television receiver 12. Thus, it can be seen that the sampled information is decoded or reconstructed in accordance with the sampling pattern as fixed by the time base of the recorded pilot signal P.

The played-back chrominance signals (R–Y)/(B–Y) are sequentially fed to the decoder 22 and processed in accordance with a switching operation in response to the horizontal sync signal $f_h$ and the vertical signc signal $f_v$ derived from the played-back pilot signal P by the synchronizer to reconstruct the chrominance signal. In operation, the red color signal (R–Y) and the blue color signal (B–Y) are selectively switched within the decoder to a separate red channel (R–Y), a separate blue channel (B–Y), respectively, and are combined for recreating a green color signal on a green channel (G–Y). These processed chrominance signals are fed to modulate the control grid of a color cathode ray tube in the color television receiver 12.

Figures 2, 3:
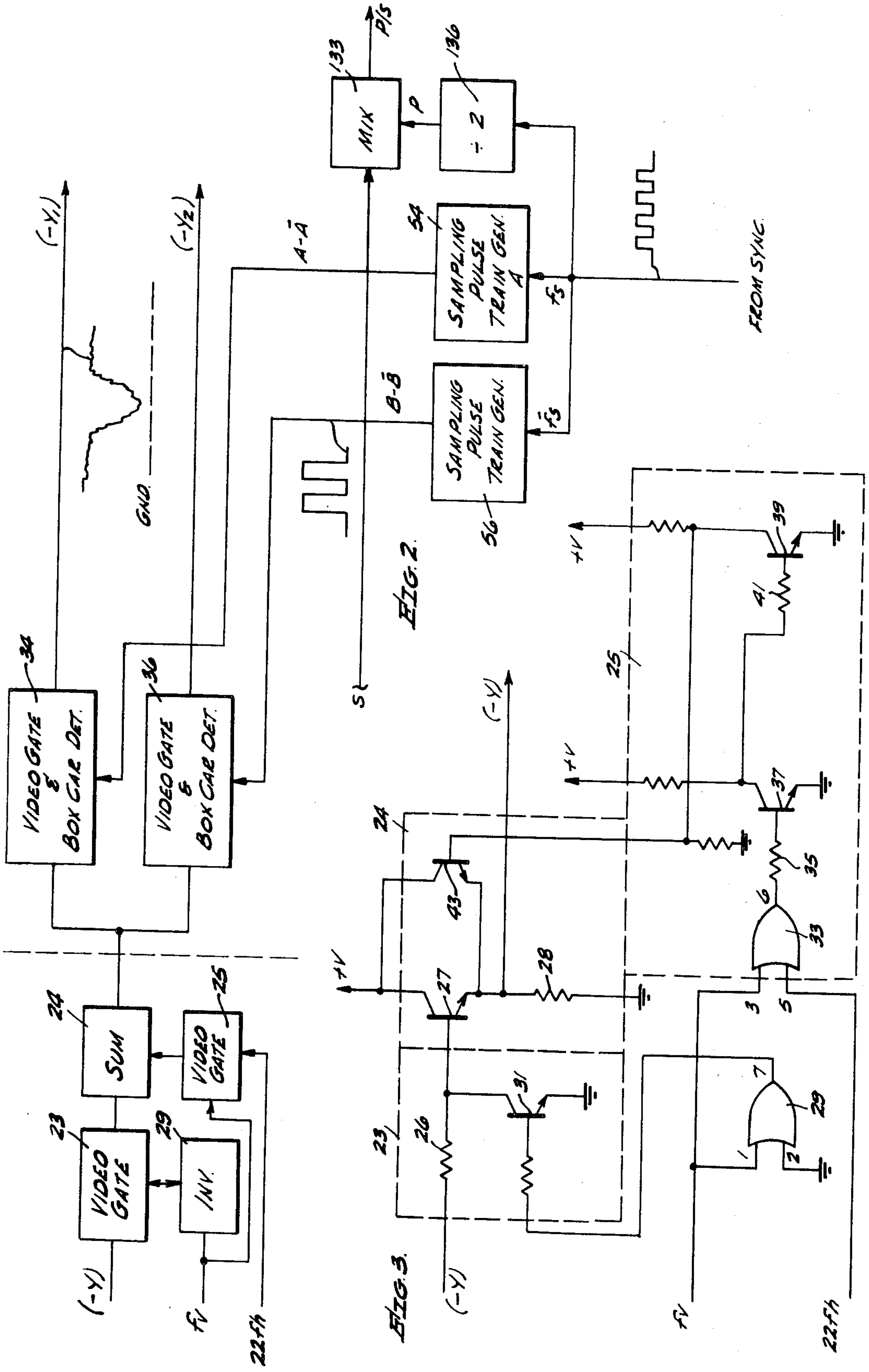
FIG. 2 is a block diagram showing a portion of the encoder for modulating the received luminance signal with the tone burst signal.
FIG. 3 is a schematic diagram of the portion of the encoder illustrated in FIG. 2 to the left of the dashed line in FIG. 2.

Referring now to the operation of the encoder illustrated in FIG. 2, the luminance signal (–Y) from the television receiver (FIG. 1) is fed through a video gate 23 and summing circuit 24 to a parallel pair of video gate and boxcar detectors 34 and 36. During the generated vertical sync pulse $f_v$, the video gate 23 is disabled and a video gate and amplifier 25 enabled to apply a tone burst signal 22 $f_h$ having a freqeuncy of 22 times the horizontal signal frequency $f_h$ (346.5 kHz.) to the video gate and boxcar detectors 34 and 36 through the summing circuit 24 to replace the received vertical sync signal $f_v$.

More specifically, the video gate 23, summing circuit 24, and video gate 25 illustrated in detail in FIG. 3, operate in the following manner. During the frame interval, the luminance signal (–Y) is fed through a resistor 26 of the video gate 23 to the base terminal of a transistor 27 in the summing circuit 24. The luminance signal (–Y) base biases the transistor 27 whereby a corresponding variation in the emitter current causes a variation in the voltage drop across a summing resistor 28. This voltage signal varies in proportion to the amplitude of the luminance signal (–Y) applied to the base terminal of transistor 27 and is fed to the video gate and boxcar detectors 34 and 36 (FIG. 2).

During the duration of the vertical sync pulse $f_v$, the video gate 23 is inhibited and the video gate and amplifier 25 is enabled to pass the tone burst signal 22 $f_h$ (346.5 kHz.) to the summing circuit 24. More specifically, the vertical sync pulse $f_v$ is applied to an input terminal of a normally on inverter amplifier 29 to turn it off, whereupon the voltage level of the output signal increases relative to a reference level and is applied through a resistor to the base terminal 31 in the video gate 23. Hereinafter, reference to an increase in or a decrease in a voltage level is relative to a reference level even though not expressly stated. One inverter amplifier circuit that could perform this operation is a "$\mu$ L–914," manufactured by the Fairchild Semiconductor Co., and illustrated in their brochure SL–66, dated August 1965, wherein the terminal connections are represented by the numeral in the figures. The rise in potential at the base terminal base biases transistor 31 on to shunt the resistor 26 and the base terminal of transistor 27 to ground, whereupon the video signal (–Y) can no longer be passed to the summing resistor 28.

In addition, the vertical sync pulse $f_v$ enables the video gate and amplifier 25 to pass the tone burst signal 22 $f_h$ to the summing circuit 24. In operation, the vertical sync pulse $f_v$ applied to one input terminal of an AND gate 33, which can be another stage of the above-referenced "$\mu$ L–914," operably enables the AND gate 33 to conduct the tone burst signal 22 $f_h$ to a two-stage amplifier through a resistor 35. The amplifier includes a grounded emitter transistor 37 which is coupled to receive the tone burst signal 22 $f_h$ at its base terminal. This base biases transistor 37 so that the collector signal varies in response to the tone burst signal 22 $f_h$ and is applied to the base terminal of a second stage grounded emitter transistor 39 through a resistor 41. The resulting collector current of transistor 39 also varies with the tone burst signal 22 $f_h$ and is applied to the base terminal of an emitter follower transistor 43 in the summing circuit 24.

The transistor 43 is base biased, whereupon its emitter current varies in accordance with the tone burst signal 22 $f_h$ applied to its base terminal. As a result, the tone burst signal of 22 $f_h$ is generated across the summing resistor 28 and is applied to the video gate and boxcar detectors 34 and 36 illustrated in FIG. 2.

As illustrated in FIG. 2, the sampling pulse train generators 54 and 56, which control the video gate and boxcar detectors 34 and 36, respectively, are responsive to sync signals received from the synchronizer 18.

The synchronizer 18, as illustrated in FIG. 1, is coupled to receive the base frequency signals such as the horizontal sync signal $f_h$ (15.75 kHz.) and the vertical sync signal $f_v$ (60 Hz.) during the recording mode and to receive the playback pilot or clock sync signal and the luminance signal (–Y) during the playback mode. The mode of operation of the synchronizer can be selectively switched between the encoder operation and the decoder operation, as will be explained in more detail with reference to FIG. 4.

Figure 4:
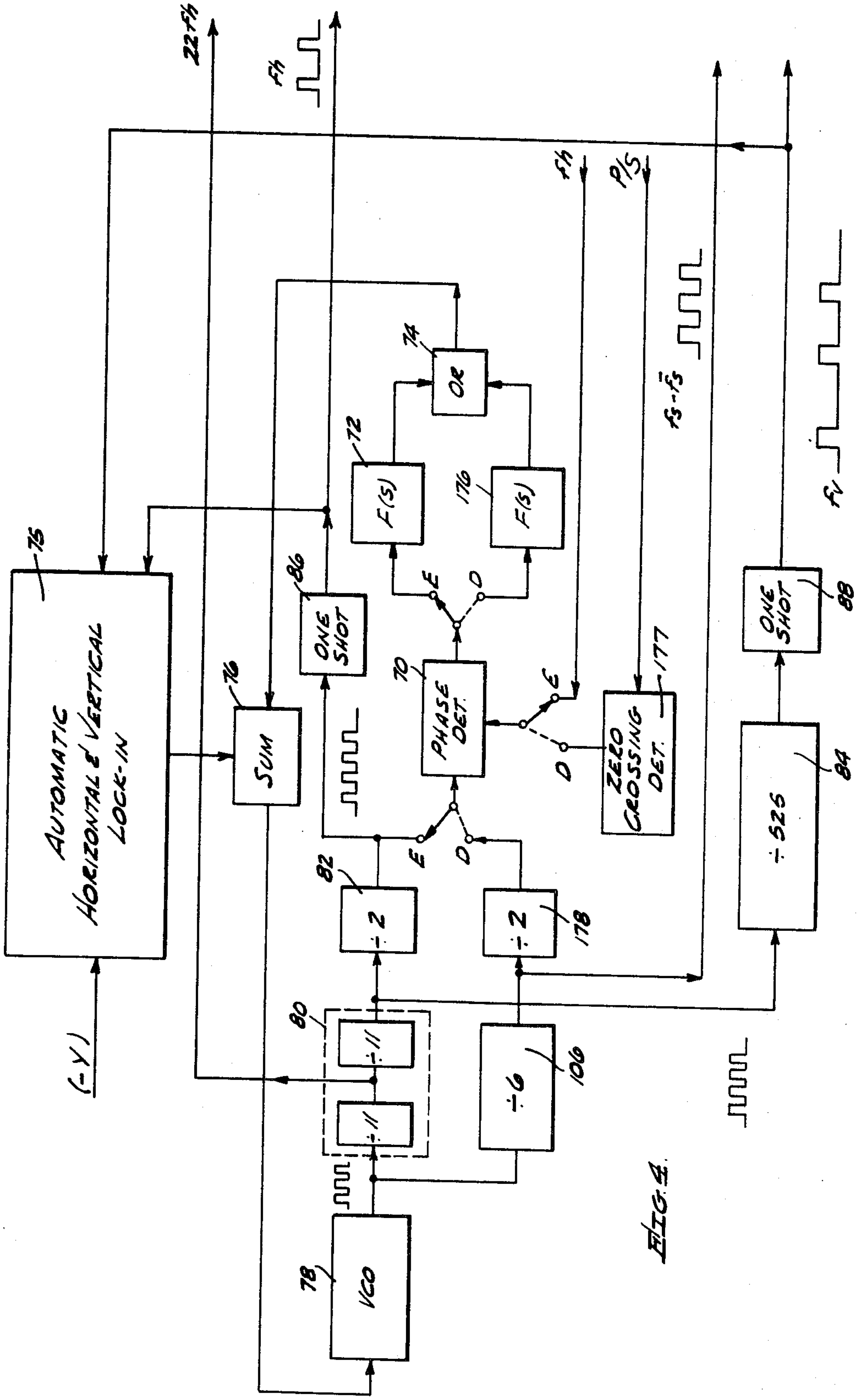
FIG. 4 is a block diagram of the synchronizer.

The synchronizer 18, as illustrated in block diagram form in FIG. 4, includes a phase detector 70 which is operably switched between a first phase-lock loop associated with the encoder when the poles of the switched inputs and outputs are connected to the terminal marked E and a phase-lock loop associated with the decoder when the poles are in contact with the switch terminals marked D.

During the encoding operation, the phase detector 70 phase compares the horizontal sync signal $f_h$ received from the television receiver with a horizontal sync signal $f_h$ generated by the phase-lock loop circuit. The generated horizontal sync signal $f_h$ is generated by a circuit that includes the following elements. A lead-lag network 72 which is coupled to receive the output signal from phase detector 70 and is operable to stabilize the phase-lock loop. The output from the lead-lag circuit 72 is applied to an OR gate 74 which is operable to gate the signal from either phase-lock loop during either mode of operation to a summing circuit 76 which is fully utilized during the decoder mode of operation. The output from the summing circuit 76 is applied to a voltage-controlled oscillator 78 which generates an output signal having a nominal frequency which is particularly useful for obtaining the unique sampling pattern described in the previously referenced copending U.S. patent application S.N. 563,763 and is harmonically related to the horizontal sync signal $f_h$ and the vertical sync signal $f_v$. The output from the voltage-controlled oscillator 78 is applied to a ÷121 circuit 80 that includes two series connected ÷11 circuits that reduce the frequency of the output signal from the voltage-controlled oscillator 78 to a frequency from which the horizontal sync pulse can be obtained by means of a further division at a ÷2 circuit 82 and from which the vertical sync signal $f_v$ can be derived by a further division by means of a ÷525 circuit 84. In both instances the horizontal sync signal $f_h$ produced by the ÷2 circuit 82 is converted to a pulse by a one-shot multivibrator 86 and the vertical sync signal $f_v$ produced by the ÷525 circuit 84 is converted to a pulse by a one-shot multivibrator 88. The horizontal sync signal output from the ÷2 circuit 82 is also phase compared with the horizontal sync signal $f_h$ received from the television receiver at the phase detector 70. Details of the particular circuit components in the synchronizer of FIG. 4 are disclosed in copending U.S. patent application S.N. 636,695, filed on May 5, 1967, by Walter H. Bockwoldt, and thus not described herein.

In this particular video tape recorder system, the output signal from the voltage-controlled oscillator 78 is frequency stabilized at 3811.5 kHz. which is harmonically related to the horizontal sync signal $f_h$ and vertical sync signal $f_v$, and is split into two circuit branches, one of which is utilized to generate the horizontal sync $f_h$ and a vertical sync signal $f_v$, and the other of which generates a sampling sync signal $f_s$.

The tone burst signal 22 $f_h$ is derived from a convenient tap point in the ÷121 circuit 80, such as between the two ÷11 stages, whereupon the tone burst signal $f_h$ is fed back to the luminance channel, as previously described with reference to FIG. 2.

The sampling sync signal $f_s$ at 635.25 kHz. is derived from the output of the voltage-controlled oscillator 78 by means of a ÷6 circuit 106. Structurally, the ÷6 circuit 106 can include a ÷3 counter connected in series with a ÷2 counter in the manner explained in copending U.S. patent application S.N. 636,695. The output from the ÷6 circuit 106 is a pair of complementary output signals which are alternately high and low relative to one another as is conventional with JK flip-flops. These outputs from the ÷6 circuit are utilized to control the operation of the gating or the sampling pulse train generators 54 and 56 (FIG. 2), respectively, located within the encoder 16 and to derive a pilot frequency signal P which is recorded on a separate parallel track. The sampling sync signal $f_s$ is fed to the encoder 16 and decoder 22 to control the operation thereof. Since the pilot signal P and the sampling sync signal $f_s$ are derived from the same time base frequency signal, their time base relative to one another is substantially invariable. Thus, any time-base instability in the recording medium will not affect the time-base stability of the sampled video information ($-Y_1$) through ($-Y_n$) relative to the pilot signal P.

As previously stated, the sampling sync signal $f_s$ is utilized to derive a pilot frequency signal P which is amplitude modulated by the audio signal S at the mixer 133 and recorded on a single recording channel within the tape recorder 20. The mixer circuit 133, illustrated in FIG. 2, can include a ÷2 circuit which is coupled to receive the sampling sync signal $f_s$ for producing the pilot signal P and a modulator mixer 133 which is coupled to receive the pilot signal P output from the ÷2 circuit and the audio signal S from the television receiver wherein the audio signal amplitude modulates the pilot signal P.

The synchronizer illustrated in FIG. 4 is operably changed to the decoder mode of operation by switching the inputs and outputs of the phase detector 70 from the E terminal connections to the D terminal connections, as indicated by the dashed lines. The phase compared output of the phase detector 70 is fed to a lead-lag network 176 which stabilizes the operation of the phase-lock loop and filters out the AC components of the phase detector output. The output from the lead-lag circuit 176 is fed to a second input of the OR gate 74 and thence to the summing network 76.

In addition, an output signal from the automatic lock-in circuit 75 is fed to the summing network 76 if the played-back video signal is out of horizontal and vertical sync as will be explained in more detail shortly. The output from the summing network 76 is fed to the voltage-controlled oscillator 78 which, as previously stated, is operable to generate an output signal having a frequency of 3811.5 kHz. when stabilized. The feedback signal to the phase detector 70 is developed in the portion of a loop containing the ÷6 circuit 106 and a ÷2 circuit 178. The ÷6 circuit 106 and the ÷2 circuit 178 are constructed from JK flip-flops in the manner explained in the previously referenced copending U.S. patent application S.N. 636,695. At the phase detector 70, the feedback signal is phase compared with the played back pilot signal of 317.6 kHz. received from the tape recorder 20.

The clock signal P is fed through a zero crossing detector 177 which changes the voltage level of the output each time the voltage level of the received amplitude modulated clock signal P/S crosses the zero voltage or threshold level.

Once the phase-lock loop is stabilized, the horizontal sync output signal $f_h$ from the one-short multivibrator 86 has a frequency of 15.75 kHz., the vertical sync output signal generated by the one-short multivibrator 88 has a frequency of 60 Hz. and the sampling sync output signal $f_s$ derived from the output of ÷6 circuit 106 has a frequency of 635.25 kHz. These output signals are then fed to the decoder 22 wherein the decoding operation is performed.

Figure 5:
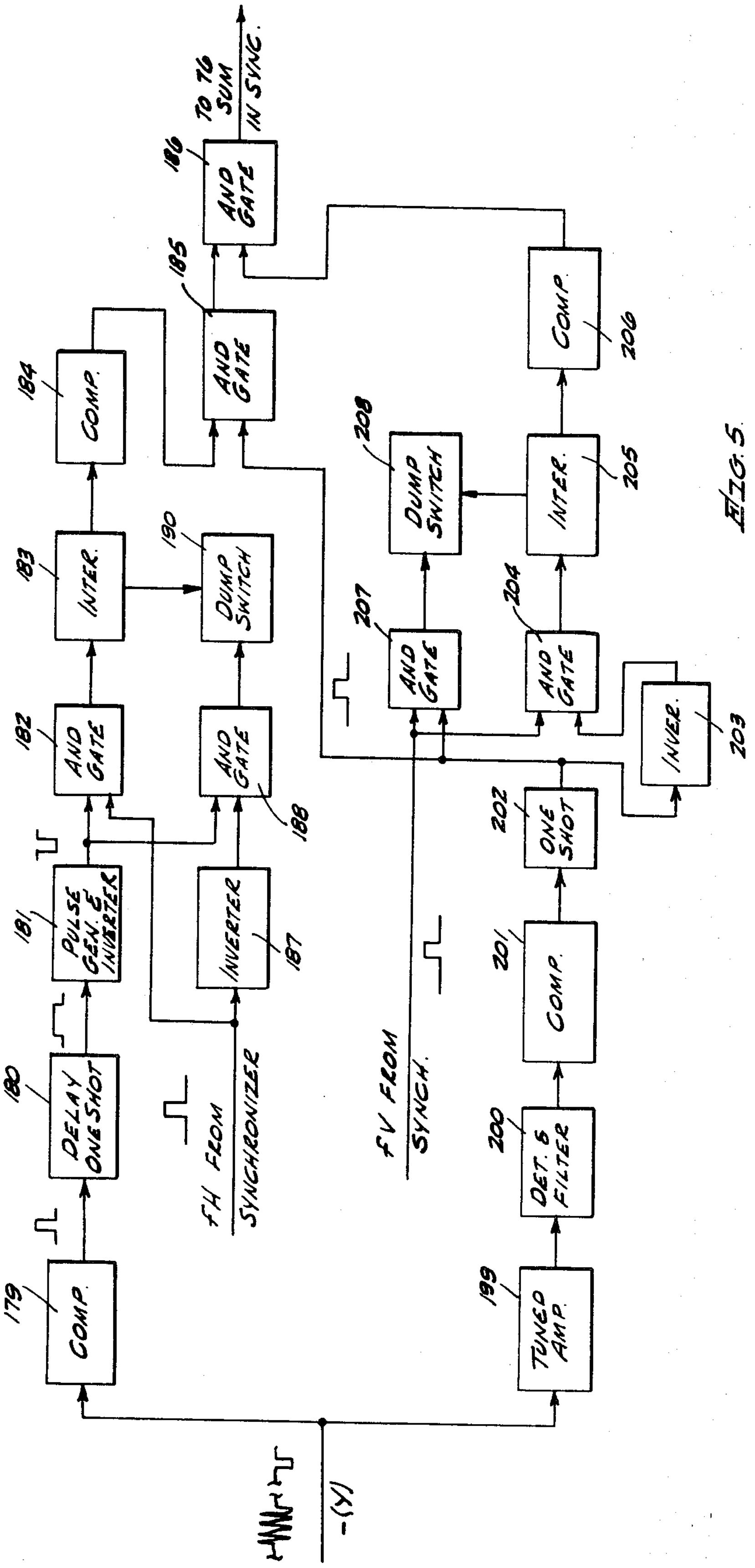
FIG. 5 is a block diagram of the automatic lock-in circuit of the synchronizer.

Referring now to the operation of the automatic lock-in circuit 75, reference is made to the circuit of FIG. 5 which receives at an input terminal the played-back luminance signal (−Y) during the decoding mode of operation and shifts the phase of sync signals generated by the voltage-controlled oscillator 78 in the synchronizer 18 into proper phase relationship with the played-back horizontal sync pulses $f_h$ and vertical sync pulses $f_v$ if there is any phase deviation between their relative positions.

To obtain a horizontal guide sync signal, the played-back horizontal sync pulses $f_h$ in the luminance signal (−Y) are received and fed to a circuit branch including comparator 179 which generates an output pulse when a threshold level is exceeded. This output pulse is fed through a delay one-shot multivibrator 180, to a pulse generator and inverter 181 which generates precise output pulses. The precise pulses are fed through an AND gate 182 to electrically charge up an integrator 183 only if the played-back horizontal sync pulses are out of phase with the horizontal sync signal $f_h$ generated by the synchronizer 18. In order to minimize false or erroneous slewing of the VCO 78, a number of the precise pulses are required before an output signal is fed to the summing net work 76. After a predetermined number of pulses are received by the integrator 183, the voltage level of its output signal is high enough to trigger a comparator 184 which feeds an output pulse through AND gate 185 and then through AND gate 186 to the summing network 76 of the synchronizer 18 (FIG. 4), whereat it is summed with the voltage signal within the feedback loop of the phase-lock loop. This additional voltage in the phase-lock loop causes a shift in the phase of the output signal from the voltage-controlled oscillator 78, thereby shifting the phase of the horizontal sync signal $f_h$ generated within the phase-lock loop. Once the phase of the horizontal sync signal from the synchronizer 18 is in phase with the played-back horizontal sync signal $f_h$, the AND gate 182 is disabled so that it no longer conducts the output pulses from the pulse generator 181. In addition, the horizontal sync pulse $f_h$ from the synchronizer 18 is fed through an inverter 187 to enable AND gate 188 relative to the played-back horizontal sync pulses $f_h$. When AND gate 188 is enabled, the resulting output pulses trigger a dump switch 190 which is coupled to electrically discharge the integrator 183. Thus, it can be seen that the integrator 183 never charges up when the played-back horizontal sync pulse $f_h$ is in phase with the sync pulse $f_h$ generated by the synchronizer 18. In addition, the dump switch 190 quickly stops slewing of the VCO to minimize overshoot.

In obtaining a vertical guide sync signal, the tone burst signal of 22 $f_h$ on the luminance signal (–Y) is played back through a circuit branch including a tuned amplifier 199 and a detector and filter 200 which passes only the envelope of the tone burst signal 22 $f_h$ to a comparator 201. When the threshold voltage level of the comparator 201 is exceeded, an output pulse is generated which triggers a one-shot multivibrator 202 to generate a vertical guide sync pulse. The vertical guide sync pulse is fed to inhibit the AND gate 185 relative to the horizontal sync pulse $f_h$, and as a result inhibits AND gate 185 to the horizontal guide sync operation and enables gate 186 relative to the vertical guide sync operation. Thus, it can be seen that the vertical guide sync operation overrides the horizontal guide sync operation. In addition, the vertical guide sync pulse from the one-slot multivibrator is fed through an inverter 203 to an AND gate 204. If the vertical guide sync pulse is not in phase with the vertical sync pulse received from the synchronizer 18, the AND gate 204 is enabled and conducts an output pulse which is fed to an integrator 205. As with the horizontal synchronization, the integrator 205 associated with vertical synchronization requires a plurality of pulses before false or erroneous slewing of the VCO 78 occurs. Of course, it may be desirable, under certain circumstances, to vary the circuit parameter to the point where the integration feature of the integrator 205 is essentially eliminated. When the integrator 205 is thus electrically charged up, the threshold voltage level of comparator 206 is exceeded, thereby generating a voltage pulse which is fed through AND gate 186 to the summing circuit 76 of the synchronizer 18, thereby shifting the phase of the voltage-controlled oscillator 78 in the phase-lock loop. When coincidence occurs between the played-back tone burst signal 22 $f_h$ and the vertical sync pulse $f_v$ received from the synchronizer, AND gate 207 is enabled and generates an output pulse which triggers a dump switch 208. The triggered dump switch 208 discharges the integrator 205.

Figure 6:
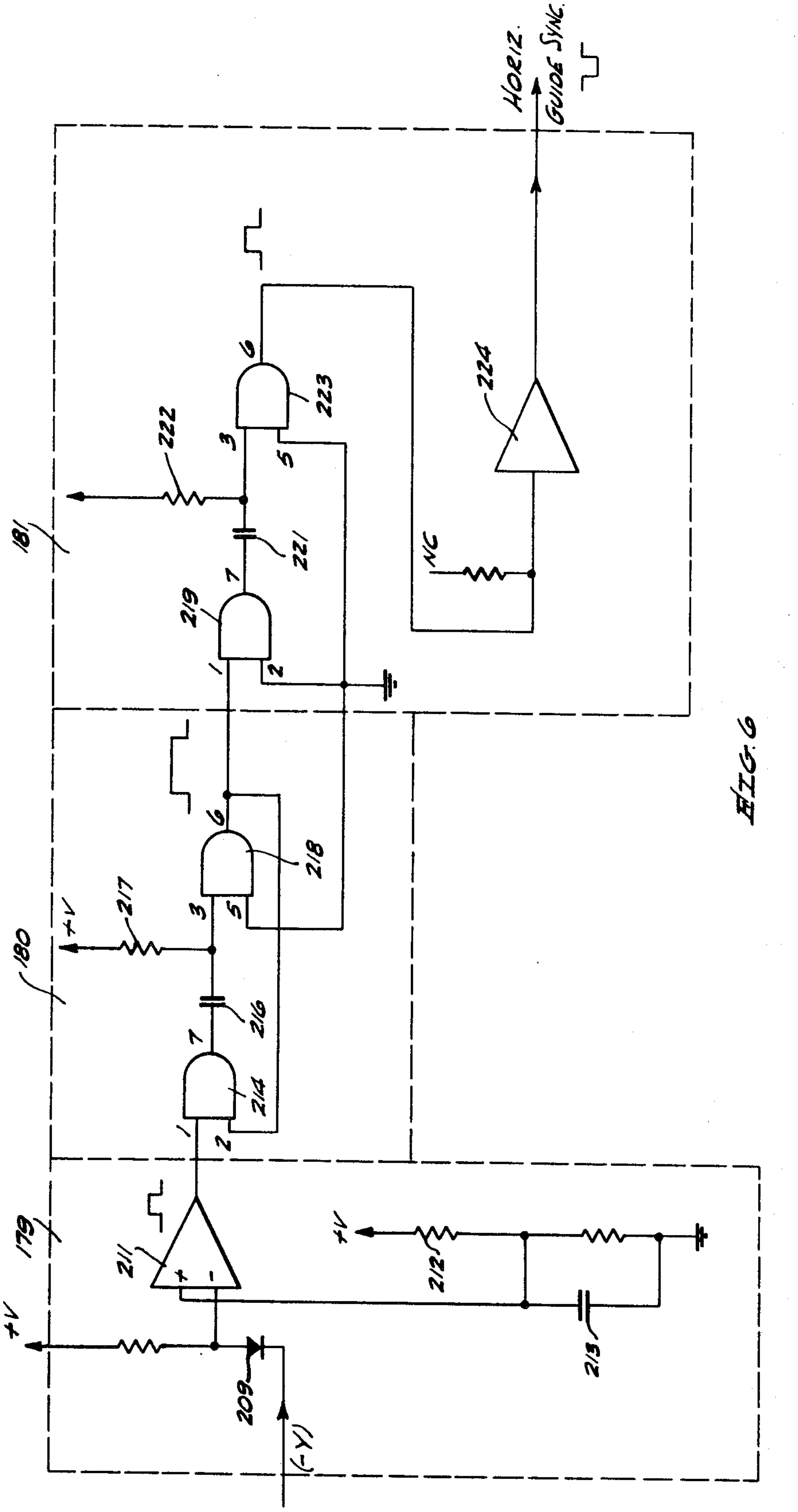
FIG. 6 is a schematic diagram of a portion of the automatic lock-in circuit illustrated in the block diagram of FIG. 5.

Referring now to the details of the automatic lock-in circuit, reference is made to FIG. 6 in which the played-back luminance signal (–Y) is fed through an isolation diode 209 to one input terminal of a comparator amplifier 211 in the comparator 179. The comparator amplifier 211 can be a "μ A–710," manufactured by the Fairchild Semiconductor Company and illustrated in their brochure SL–66, dated August 1965. The threshold voltage level of the comparator amplifier 211 is set by the tap position of a voltage divider 212 which builds up an electrical charge in capacitor 213, thereby maintaining a threshold voltage level which is fed to the other input at the comparator amplifier. When the threshold voltage level is exceeded by the played-back horizontal sync signal $f_h$, a positive-going output pulse is generated which is fed to the delay one-shot multivibrator 180.

The delay one-shot multivibrator 180 includes a first amplifier stage 214 which is operably overdriven by the pulse received at its input terminal. The output pulse from amplifier stage 214 is fed through an RC timing circuit, including a series capacitor 216 and a shunting resistor 217 to an input terminal in a second stage amplifier 218. The second stage amplifier 218 is responsive to the input signal and generates a positive-going pulse which is fed to the pulse generator and inverter 181. Hereinafter, reference to a positive-going pulse or to a negative-going pulse should be understood to mean that the amplitude of the pulse becomes more positive or more negative, respectively, to the amplitude of the signal when the associated circuit element is in another operating state. In addition, this positive-going pulse is fed back to an input terminal of a first stage amplifier to turn it off, whereby the voltage across capacitor 216 is high enough to keep the second stage amplifier 218 or a predetermined time interval, whereafter, because of the discharge of capacitor 216 it is turned off. One circuit that has been utilized includes two stages of an inverter amplifier such as a "μ L–914," manufactured by the Fairchild Semiconductor Company and described and illustrated in their brochure SL–66 dated August 1965.

The pulse generator and inverter 181 includes a first stage amplifier 219 which is coupled to receive the output pulse from the delay one-shot multivibrator 180, whereupon it generates an output pulse which is fed through an RC timing circuit including a series capacitor 221 and a shunting resistor 222 to an input terminal of a second stage amplifier 223. The second stage amplifier is responsive to the input pulse and generates a positive-going pulse where, after a predetermined time duration, the RC time constant of the capacitor 221 and resistor 222 is such to change the operating stage of the amplifier stage 223, whereupon the pulse signal level goes negative. A circuit that can be used for the amplifier stages 219 and 223 includes the previously referenced "μ L–914" connected in the illustrated manner. The output pulse from the one-shot multivibrator is fed through an inverter 224, wherein its sense is changed. A circuit that is used for the inverter amplifier 224 is a "μ L–900," manufactured by the Fairchild Semiconductor Company and described and illustrated in their brochure SL–66, dated August 1965.

Figure 7:
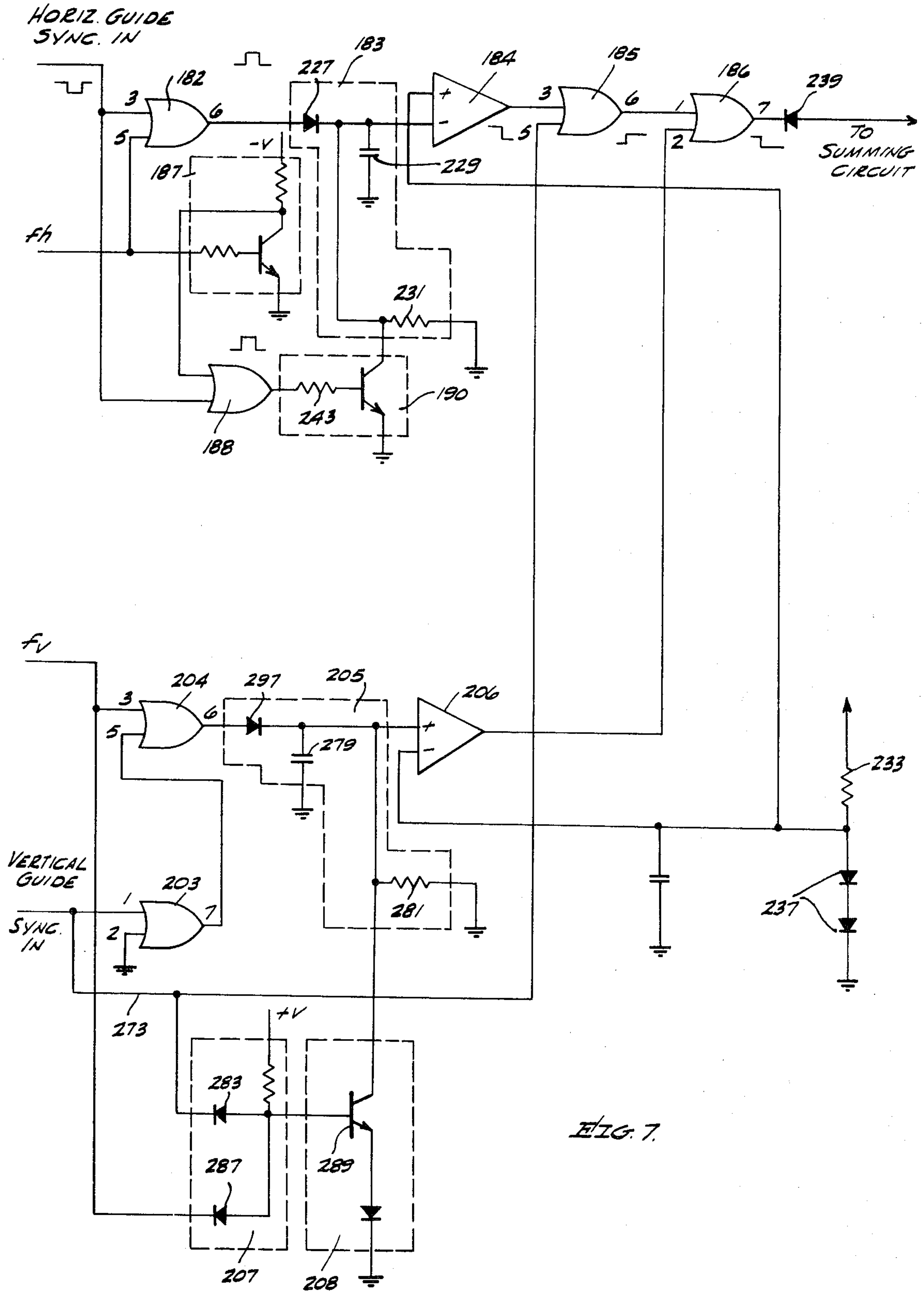
FIG. 7 is a schematic diagram of a portion of the automatic lock-in circuit illustrated in the block diagram of FIG. 5.

As illustrated in FIG. 7, the AND gate 182 is coupled to receive at one input terminal the negative-going horizontal guide sync pulse from the pulse generator and inverter 181 and to receive at a second input terminal the positive-going horizontal sync signal $f_h$ from the synchronizer 18. If the horizontal guide sync pulse is in synchronism with the horizontal sync signal from the synchronizer 18, the output of AND gate 182 remains constant. When, however, the two input pulses to AND gate 182 are out of synchronism, a positive-going pulse is generated which is fed to the integrator 183. One circuit that is used for AND gate 182 is a "μ L–914" of the previously referenced type.

The integrator 183 includes an isolation diode 227 which is forward biased to conduct the positive-going pulse to charge up a storage capacitor 229 which is connected in shunt to a ground terminal. The RC time constant of the storage capacitor 229 and a resistor 231 is such that the voltage developed across capacitor 229 as a result of the charge buildup, is at a predetermined rate. The voltage signal developed across capacitor 229 is fed to the comparator 184.

The comparator 184 receives the output signal from the integrator at one input terminal and a threshold level signal at a second input terminal. The threshold level voltage is set by the voltage divider action of the tap point between a resistor 233 and a pair of series-connected diodes 237. In operation, when the voltage level of the input signal received from the integrator 183 is below the threshold level, the output signal level from comparator 184 remains substantially constant. When, however, the threshold level is exceeded, the comparator 184 generates a negative-going signal. One circuit that will perform this operation is the previously referenced "μ A–710." The output signal from the comparator is fed to a logic circuit including the first AND gate 185 connected in series with the second AND gate 186.

Assuming that the vertical guide sync operation is not taking place, the AND gate 185 is enabled relative to the output from comparator 184, whereupon, if there is no change in the output signal from comparator 184, there is no change in the output of AND gate 185. As a result, the output from the AND gate 186 which is coupled to receive the output signal from AND gate 185, remains constant and thus, no signal is fed through an isolation diode 239 to the summing circuit in the synchronizer.

If, however, the output signal from comparator 184 is the negative-going signal, the AND gate 185 generates a positive-going output pulse which is fed to the AND gate 186. The AND gate 186 is responsive to the positive-going input pulse and generates a negative-going output signal which is fed through the isolation diode 239 to the summing circuit in the synchronizer 18 when the horizontal guide sync signal is out of synchronism with the horizontal sync signal $f_h$ generated by the synchronizer circuit 18.

When the horizontal guide sync pulse and the horizontal sync pulse $f_h$ from the synchronizer 18 are in synchronism or phase with one another, the integrator 183 is discharged in the following manner. The negative-going horizontal guide sync signal from the pulse generator and inverter 181 is fed to one input terminal of the AND gate 188. The positive-going horizontal sync signal $f_h$ from the synchronizer 18 is fed to base bias a transistor in the inverter 187. This base bias results in a corresponding collector current flow through a resistor and a corresponding negative-going voltage pulse at the collector terminal. This negative-going pulse is fed to the second input terminal of the AND gate 188. When the two input pulses to AND gate 188 are in synchronism or in phase, the AND gate 188 generates a positive-going output pulse signal which is fed to turn on the dump switch 190. When, however, the two input signals to AND gate 188 are out of phase, the output level of AND gate 188 remains constant and the dump switch 190 is not turned on. One AND gate that will perform this function is the previously referenced "μ L–914."

The dump switch 190 includes a transistor having its base terminal connected to receive the output signal from AND gate 188 through a resistor 243. The positive-going pulse base biases the transistor on. With the transistor on, the capacitor 229 of the integrator 183 is discharged to the ground reference terminal through the transistor. Thus, it can be seen that the capacitor 229 in the integrator does not charge up when the horizontal guide sync signal and the horizontal sync signal $f_h$ are in phase or synchronism with one another.

Figure 8:
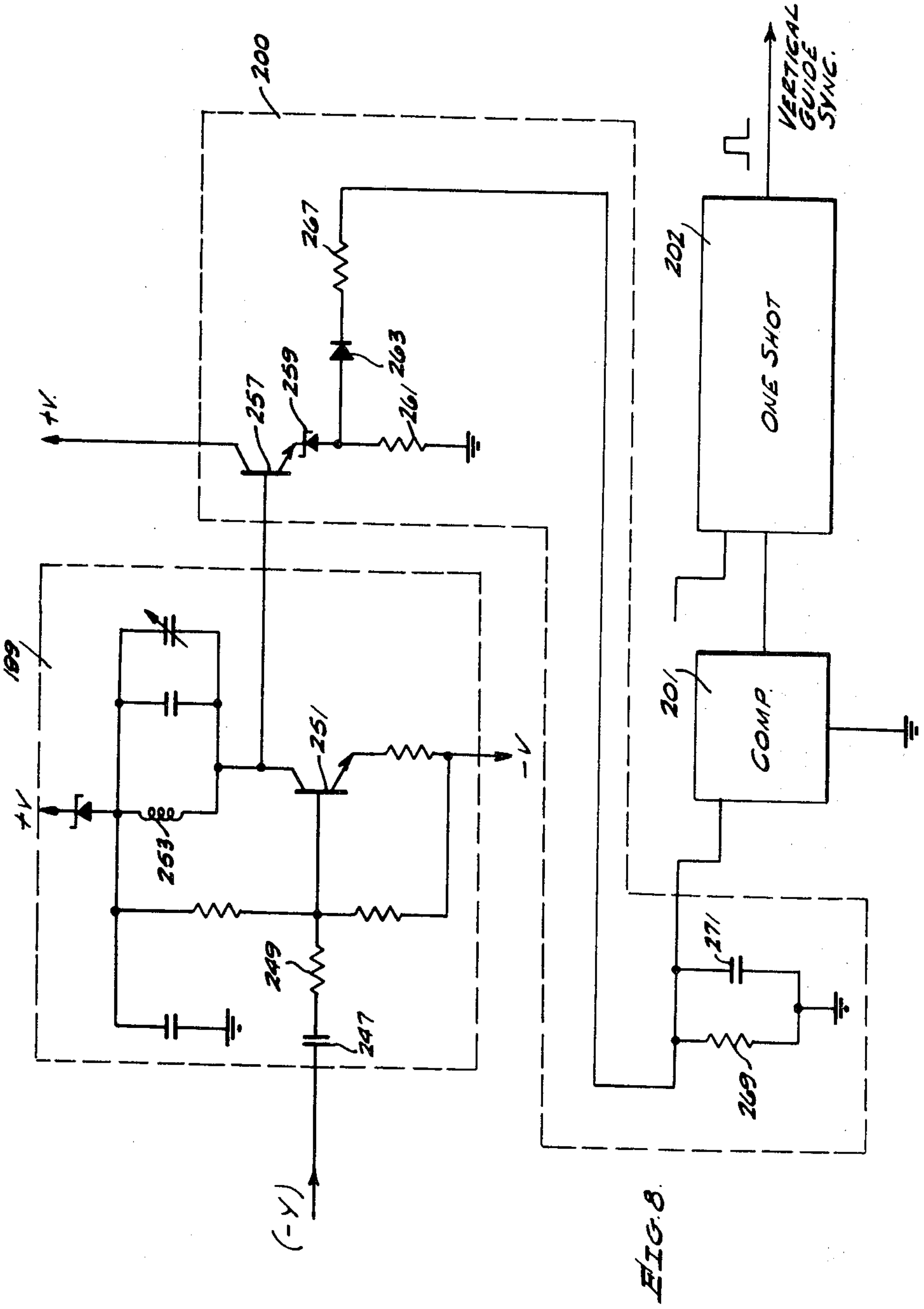
FIG. 8 is a schematic diagram of a portion of the automatic lock-in circuit illustrated in the block diagram of FIG. 5.

Referring now to the vertical guide sync operation which overrides the above-described horizontal guide sync operation, reference is made to FIG. 8 wherein the played-back luminance signal (–Y) is fed through a coupling capacitor 247 and resistor 249 to base bias a transistor 251 within the tuned amplifier 199. The base bias of transistor 251 results in a corresponding collector current flow through the tuned parallel LC circuit 253. The tuned circuit 253 is tuned to the frequency of the tone burst signal 22 $f_h$, whereupon the amplified tone burst signal base biases transistor 251. The resulting collector signal of transistor 251 is an amplified tone burst signal 22 $f_h$ which is fed to the detector and filter 200.

The detector and filter 200 is operable to filter out the 22 $f_h$ carrier of the tone burst signal and to produce an output signal corresponding to the envelope of the tone burst signal. In operation, the 22 $f_h$ output signal from the tuned amplifier 199 is fed to base bias an emitter follower transistor 257 in the detector and filter 200. The base bias results in an emitter current flow through a Zener diode 259 and emitter resistor 261. When the voltage signal developed across resistor 261 is high enough to forward bias the detector diode 263, a signal is conducted through series resistor 267 to a load resistor 269. When the diode 263 is conducting, a filter capacitor 271 connected in parallel with the load resistor 269 receives an electrical charge and develops a potential thereacross corresponding to the voltage drop across load resistor 269. When the diode 263 is nonconducting, the capacitor 271 partially discharges through resistor 269 at a time rate determined by their RC time constant. Thus, only the envelope of the tone burst signal 22 $f_h$ is fed to the comparator 201.

The voltage level on the output terminal of comparator 201 becomes more negative when the threshold level of the comparator is exceeded by the detected tone burst signal thus making the circuit less sensitive to signal noise. The comparator 201 is substantially identical in structure to the previously described comparator circuits.

The one-shot multivibrator 202 receives the output signal from the comparator 201 and generates a positive-going vertical guide sync pulse signal on its output terminals which is fed to the AND gates 185 and 207 and AND gate 204 through an inverter, as illustrated in FIG. 7.

More specifically, the positive vertical guide sync pulse from the one-shot multivibrator 202 is fed over line 273 to one input terminal of the AND gate 185. This input signal inhibits AND gate 185 relative to the horizontal guide sync signal from comparator 184. As a result, the AND gate 185 is disabled relative to the horizontal guide sync pulse signals and the AND gate 186 conducts only to the vertical guide sync signals.

In addition, the vertical guide sync signal is phase compared with the vertical sync pulse $f_v$ generated by the synchronizer 18 in the following manner. The vertical guide sync signal is fed through the inverter 203, wherein its sense is changed to a negative-going pulse which is applied to one input terminal of AND gate 204. In addition, the vertical sync signal $f_v$ from the synchronizer 18 is fed to the second input terminal in the AND gate 204, whereupon, if the input signals are out of phase or synchronism with one another, the voltage level on the output terminal of AND gate 204 becomes more positive and forward biases a diode 297 in the integrator 205. If, however, the horizontal guide sync pulse and the vertical sync pulse $f_v$ from the synchronizer are in phase, the voltage level on the output terminal of AND gate 204 does not change.

When diode 297 is forward biased by the output signal from AND gate 204, a storage capacitor 279 receives an electrical charge at a rate determined by the RC time constant of the capacitor 279 and the combination of a resistor 281 connected in parallel with the output resistance of AND gate 204. This results in a potential buildup across capacitor 279 which forms an integrator output signal.

The integrator output signal is fed to one input terminal of a comparator 206 of the previously described type, wherein the voltage level on the output terminal of the comparator rises when the threshold level of the comparator is exceeded. The threshold level of the comparator 206 is set by the voltage divider action between resistor 233 and diode 237.

The AND gate 186 is enabled relative to the output signal comparator 206 so that a decrease in the potential on the output lead of AND gate 186 occurs when the comparator 206 generates an output signal. The output signal from the AND gate 186 is fed through the diode 239 to the summing circuit in the phase lock loop of the synchronizer 18.

If the vertical guide sync signal and the vertical sync signal $f_V$ from the synchronizer are in phase with one another, the integrator 205 is discharged through the dump switch 208 in the following manner. The vertical guide sync signal is fed over line 273 to one input diode 283 of the AND gate 207. The vertical sync pulse $f_V$ from the synchronizer 18 is fed to the second input diode 287 of the AND gate 207. When the two input signals are in phase, the AND gate develops a positive-going output pulse which is fed to the dump switch 208.

The dump switch 208 includes a transistor 289 having a base terminal connected to receive the output signal from AND gate 207. When the output signal becomes more positive, it base biases the transistor 289 on, thereby discharging the capacitor 279 in the integrator 205 to ground.

When, however, the vertical guide sync signal and the vertical sync pulse $f_V$ from the synchronizer 18 are out of phase, the AND gate 207 is not enabled and, as a result, the voltage level on its output terminal remains constant, whereupon the transistor 289 in the dump switch 208 is maintained in an off condition. Thus, the capacitor 279 in the integrator can receive an electrical charge.

Although the above-described embodiment has been described in conjunction with a video tape recorder system, the principles of the invention can be utilized in other environments such as transmission of video signals over long distances or in environments where the signal-to-noise ratio of the signal is very low.

While the salient features have been illustrated and described with respect to a particular embodiment, it should be readily apparent that modifications can be made within the spirit and scope of the invention, and it is therefore not desired to limit the invention to the exact details shown and described.

What is claimed is:

1. A television synchronizer comprising:

means responsive to base frequency signals of a video signal for generating a tone burst signal and a pilot signal in response thereto when operating in a first mode, and responsive to a pilot signal for generating base frequency signals when operating in a second mode;

means coupled to receive the video signals and the tone tone burst signals for applying the tone burst signals to a portion of the video signal; and means coupled to receive the base frequency signals generated by the first said means and to receive the video signals with the tone burst signal for comparing phase deviation therebetween and generating a guide sync signal when the received signals are out of proper phase, which guide sync signal is fed back to the first said means, the first said means being responsive to the guide sync signal for shifting the phase of the generated base frequency signals into proper phase relationship with the tone burst signal.

2. The television synchronizer of claim 1 in which the first said means is further operable to generate television base frequency signals when operating in the first mode.

3. The television synchronizer of claim 2 in which the television base frequency signals comprise a vertical sync signal.

4. The television synchronizer of claim 2 in which the television base frequency signals include a horizontal sync signal.

5. The television synchronizer of claim 4 in which the third said means is further coupled to further receive the base the frequency horizontal sync signals of the video signal having the tone burst signal for comparing phase deviation between the received video horizontal sync signal and the generated horizontal sync signal and generating a horizontal guide sync signal when the signals are out of proper phase, which horizontal guide sync signal is fed back to the first said means, the first said means being responsive to the horizontal guide sync signal for shifting the phase of the generated horizontal sync signal into proper phase relationship with the received video horizontal sync signal.

6. The television synchronizer of claim 2 in which the third said means is further coupled to receive the horizontal sync signals of the video signal having the tone burst signal for comparing phase deviation between the received video horizontal sync signal and the generated horizontal sync signal and generating a horizontal guide sync signal when the signals are out of proper phase, which horizontal guide sync signal is fed back to the first said means, the first said means being responsive to the horizontal guide sync signal for shifting the phase of the generated horizontal sync signal into proper phase relationship with the received video horizontal sync signal.

7. The television synchronizer of claim 2 in which the third said means is coupled to receive the video signal having the tone burst signal thereon for comparing phase deviation between the envelope of the received tone burst signal and a generated vertical sync signal and generating a vertical guide sync signal when the signals are out of proper phase, which vertical guide sync signal is fed back to the first said means, the first said means being responsive to the vertical guide sync signal for shifting the phase of the generated vertical sync signal into proper phase relationship with the received tone burst signal.

8. The television synchronizer of claim 7 in which the third said means further includes means coupled to receive the vertical guide sync signal and the horizontal guide sync signal for conducting the horizontal guide sync signal to the first said means only if the vertical guide sync signal is not being conducted to the first said means.

9. The television synchronizer of claim 2 in which the base frequency signal generated by the first said means are fed to the second said means for modulating the video signal.

10. The television synchronizer of claim 9 in which the second said means is further responsive to the received vertical sync signal generated by the first said means for applying the tone burst signal to the video signal during the vertical sync signal duration.

11. The television synchronizer of claim 1 in which the first said means is further operable to generate a vertical sync signal and a horizontal sync signal.

12. The television synchronizer of claim 11 in which the third said means is further coupled to further receive the base frequency horizontal sync signals of the video signal having the tone burst signal for comparing phase deviation between the received video horizontal sync signal and the generated horizontal sync signal and generating a horizontal guide sync signal when the signals are out of proper phase, which horizontal guide sync signal is fed back to the first said means, the first said means being responsive to the horizontal guide sync signal for shifting the phase of the generated horizontal sync signal into proper phase relationship with the received video horizontal sync signal.

13. The television synchronizer of claim 12 in which the third said means is coupled to receive the video signal having the tone burst signal thereon for comparing phase deviation between the envelope of the received tone burst signal and a generated vertical sync signal and generating a vertical guide sync signal when the signals are out of proper phase, which vertical guide sync signal is fed back to the first said means, the first said means being responsive to the vertical guide sync signal for shifting the phase of the generated vertical sync signal into proper phase relationship with the received tone burst signal.

14. The television synchronizer of claim 13 in which the third said means further includes means coupled to receive the vertical guide sync signal and the horizontal guide sync signal for conducting the horizontal guide sync signal to the first said means only if the vertical guide sync signal is not being conducted to the first said means.

15. The television synchronizer of claim 14 in which the base frequency signal generated by the first said means are fed to the second said means for modulating the video signal.

16. The television synchronizer of claim 15 in which the second said means is further responsive to the received vertical sync signal generated by the first said means for applying the tone burst signal to the video signal during the vertical sync signal duration.

17. The television synchronizer of claim 13 in which the base frequency signal generated by the first said means are fed to the second said means for modulating the video signal.

18. The television synchronizer of claim 17 in which the second said means is further responsive to the received vertical sync signal generated by the first said means for applying the tone burst signal to the video signal during the vertical sync signal duration.

19. The television synchronizer of claim 12 in which the base frequency signal generated by the first said means are fed to the second said means for modulating the video signal.

20. The television synchronizer of claim 19 in which the second said means is further responsive to the received vertical sync signal generated by the first said means for applying the tone burst signal to the video signal during the vertical sync signal duration.

21. The television synchronizer of claim 11 in which the third said means is coupled to receive the video signal having the tone burst signal thereon for comparing phase deviation between the envelope of the received tone burst signal and a generated vertical sync signal and generating a vertical guide sync signal when the signals are out of proper phase, which vertical guide sync signal is fed back to the first said means, the first said means being responsive to the vertical guide sync signal for shifting the phase of the generated vertical sync signal into proper phase relationship with the received tone burst signal.

22. The television synchronizer of claim 21 in which the third said means further includes means coupled to receive the vertical guide sync signal and the horizontal guide sync signal for conducting the horizontal guide sync signal to the first said means only if the vertical guide sync signal is not being conducted to the first said means.

23. The television synchronizer of claim 21 in which the base frequency signal generated by the first said means are fed to the second said means for modulating the video signal.

24. The television synchronizer of claim 23 in which the second said means is further responsive to the received vertical sync signal generated by the first said means for applying the tone burst signal to the video signal during the vertical sync signal duration.

25. The television synchronizer of claim 11 in which the base frequency signal generated by the first said means are fed to the second said means for modulating the video signal.

26. The television synchronizer of claim 25 in which the second said means is further responsive to the received vertical sync signal generated by the first said means for applying the tone burst signal to the video signal during the vertical sync signal duration.

27. The television synchronizer of claim 1 in which the third said means is further coupled to receive the base frequency horizontal sync signals of the video signal having the tone burst signal for comparing phase deviation between the received video horizontal sync signal and the generated horizontal sync signal and generating a horizontal guide sync signal when the signals are out of proper phase, which horizontal guide sync signal is fed back to the first said means, the first said means being responsive to the horizontal guide sync signal for shifting the phase of the generated horizontal sync signal into proper phase relationship with the received video horizontal sync signal.

28. The television synchronizer of claim 27 in which the third said means is coupled to receive the video signal having the tone burst signal thereon for comparing phase deviation between the envelope of the received tone burst signal and a generated vertical sync signal and generating a vertical guide sync signal when the signals are out of proper phase, which vertical guide sync signal is fed back to the first said means, the first said means being responsive to the vertical guide sync signal for shifting the phase of the generated vertical sync signal into proper phase relationship with the received tone burst signal.

29. The television synchronizer of claim 28 in which the third said means further includes means coupled to receive the vertical guide sync signal and the horizontal guide sync signal for conducting the horizontal guide sync signal to the first said means only if the vertical guide sync signal is not being conducted to the first said means.

30. The television synchronizer of claim 1 in which the third said means is coupled to receive the video signal having the tone burst signal thereon for comparing phase deviation between the envelope of the received tone burst signal and a generated vertical sync signal and generating a vertical guide sync signal when the signals are out of proper phase, which vertical guide sync signal is fed back to the first said means, the first said means being responsive to the vertical guide sync signal for shifting the phase of the generated vertical sync signal into proper phase relationship with the received tone burst signal.

31. The television synchronizer of claim 30 in which the third said means further includes means coupled to receive the vertical guide sync signal and the horizontal guide sync signal for conducting the horizontal guide sync signal to the first said means only if the vertical guide sync signal is not being conducted to the first said means.

32. A tone burst synchronizer comprising:

signal generator means responsive to the horizontal sync signal in a first mode of operation for generating a horizontal synch signal, a vertical sync signal, a tone burst signal and a pilot signal which are harmonically related to one another and being responsive to the pilot signal in a second mode of operation for generating a horizontal sync signal and a vertical sync signal;

gate means coupled to receive a video signal and the tone burst signal and being responsive to the vertical sync signal generated by said signal generator means for modulating the received video signal with the tone burst signal during the vertical sync signal duration;

lock-in means including a horizontal lock-in channel and a vertical lock-in channel, said horizontal lock-in channel including a first gate means coupled to receive a pulse signal related to the received video signal, horizontal sync signal and the horizontal sync signal generated by said signal generator means during the second mode of operation for generating a pulse signal related to the phase difference between the video signal horizontal sync signal and the generated horizontal sync signal received from said signal generator means, first storage means coupled to receive and store the pulse signals from said first gate means, first comparator means coupled to said first storage means for generating an output signal when the level of the stored signal exceeds a predetermined level, second gate means coupled to receive and conduct the output signal from said first comparator means to said signal generator means for shifting the phase of the harmonically related generated signals to thereby shift the generated horizontal sync signal into phase with the video signal horizontal sync signal, and first dump switch means coupled to said first storage means and coupled to receive the generated horizontal sync signal and the video signal horizontal sync signal for maintaining the level of the stored signals below the predetermined level when the video signal horizontal sync signal and the generated horizontal sync signal are in phase, and said vertical lock-in channel including, detector means coupled to receive the video signal for detecting the envelope of the tone burst signal and generating a pulse related thereto, third gate means coupled to receive the pulse related to the tone burst signal and to receive the vertical sync signal generated by said signal generator during the second mode of operation for generating a pulse signal related to the phase difference between the tone burst signal and the generated vertical sync signal received from said signal generator means, second storage means coupled to receive the store of pulse signals from said third gate means, second comparator means coupled to said second storage means for generating an output signal when the level of storage signal exceeds a predetermined level, the output signal from said second storage means being fed to said second gate means, said second gate means being further responsive to the pulse related to the tone burst signal for blocking any output signal from said first comparator in said horizontal lock-in channel and for conducting any output signal from said second comparator in said vertical lock-in channel to said signal generator means for shifting the phase of the generated signal to thereby shift the generated vertical sync signal into phase with the envelope of the tone burst signal, and second dump switch means coupled to said second storage means and to receive the pulse related to the tone burst signal and the generated vertical sync signal for maintaining the signal level of the storage signals below the predetermined level when the pulses related to the tone burst signal and the generated vertical sync signal are in phase.

References Cited

UNITED STATES PATENTS 3,065,296 11/1962 Marsden.
3,335,218 8/1967 Johnson.
3,347,997 10/1967 Woodruff.
3,413,414 11/1968 Baldwin et al.

ROBERT L. GRIFFIN, Primary Examiner
G. G. STELLAR, Assistant Examiner

U.S. Cl. X.R.

178—606